United States Patent
Grassia

(10) Patent No.: US 10,881,240 B2
(45) Date of Patent: Jan. 5, 2021

(54) ADJUSTABLE PORTAFILTER AND GRIND ADJUSTMENT

(71) Applicant: Breville Pty Limited, Alexandria (AU)

(72) Inventor: Robert Grassia, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 293 days.

(21) Appl. No.: 15/027,244

(22) PCT Filed: Oct. 8, 2014

(86) PCT No.: PCT/AU2014/000959
§ 371 (c)(1),
(2) Date: Apr. 4, 2016

(87) PCT Pub. No.: WO2015/051401
PCT Pub. Date: Apr. 16, 2015

(65) Prior Publication Data
US 2016/0242590 A1 Aug. 25, 2016

(30) Foreign Application Priority Data
Oct. 8, 2013 (AU) .................... 2013903860

(51) Int. Cl.
*A47J 31/06* (2006.01)
*A47J 31/38* (2006.01)
*A47J 31/44* (2006.01)

(52) U.S. Cl.
CPC ....... *A47J 31/0647* (2013.01); *A47J 31/0663* (2013.01); *A47J 31/38* (2013.01); *A47J 31/4403* (2013.01); *A47J 2031/0694* (2013.01)

(58) Field of Classification Search
CPC .. A47J 31/0668; A47J 31/0647; A47J 31/368; A47J 31/4496; A47J 31/0663;
(Continued)

(56) References Cited

U.S. PATENT DOCUMENTS 1,879,129 A * 9/1932 De Vinney .............. B28C 7/122
222/50
4,489,523 A * 12/1984 Webster .................. B24B 3/242
356/636

(Continued)

FOREIGN PATENT DOCUMENTS

AU      2012/0209041 A1    2/2013
AU         2012238273 A1   4/2013
(Continued)

OTHER PUBLICATIONS

Extended European Search Report for European Patent Application No. 14852875.5, dated Jul. 17, 2017.
(Continued)

*Primary Examiner* — Tu B Hoang
*Assistant Examiner* — Vy T Nguyen
(74) *Attorney, Agent, or Firm* — Marshall, Gerstein & Borun LLP

(57) ABSTRACT

A portafilter apparatus for an espresso machine, the apparatus comprising: a metal head that is attachable to a group head of the espresso machine, the head defines a coffee grounds compartment for containing a quantity of ground coffee; and a perforated movable floor within the head; the floor forms a filter and defines the base of the coffee grounds compartment, the floor is vertically movable with respect to the head to adjust a volume of the coffee grounds compartment.

20 Claims, 8 Drawing Sheets

(58) Field of Classification Search
CPC ................ A47J 31/3685; A47J 31/4464; A47J 31/0684; A47J 31/0689; A47J 31/4467; A47J 31/542; A47J 31/58; A47J 31/0621; A47J 31/36
See application file for complete search history.

(56) References Cited

U.S. PATENT DOCUMENTS

| | | | | |
|---|---|---|---|---|
| 6,021,706 | A * | 2/2000 | Seguenot | A47J 31/0647 99/302 R |
| 6,192,786 | B1 * | 2/2001 | Gasser | A47J 31/0647 99/319 |
| 2005/0193891 | A1 * | 9/2005 | Garson | A47J 31/3614 99/279 |
| 2006/0283330 | A1 * | 12/2006 | Lin | A47J 31/4482 99/279 |
| 2010/0236420 | A1 * | 9/2010 | Remo | A47J 31/0657 99/299 |
| 2011/0162538 | A1 * | 7/2011 | Wu | A47J 42/08 99/537 |
| 2011/0297002 | A1 | 12/2011 | Vitel et al. | |
| 2013/0264405 | A1 * | 10/2013 | Audette | A47J 43/0722 241/277 |
| 2014/0263783 | A1 * | 9/2014 | Benoit | A47J 43/0705 241/100 |
| 2015/0257600 | A1 * | 9/2015 | Krus | A47J 42/46 241/169.1 |

FOREIGN PATENT DOCUMENTS

| | | | | |
|---|---|---|---|---|
| AU | 2012238276 | A1 * | 4/2013 | .......... A47J 31/0663 |
| AU | 2012238276 | A1 | 4/2013 | |
| CN | 101801245 | A | 8/2010 | |
| CN | 103027591 | A | 4/2013 | |
| EP | 0097129 | A1 | 12/1983 | |
| EP | 0663172 | A1 | 7/1995 | |
| EP | 2087818 | A1 | 8/2009 | |
| FR | 2142885 | A1 | 2/1973 | |
| FR | 2766346 | A1 | 1/1999 | |
| WO | WO-98/19584 | A1 | 5/1998 | |
| WO | WO-2012045112 | A1 | 4/2012 | |

OTHER PUBLICATIONS

International Search Report and Written Opinion for PCT/AU2014/000959, dated Oct. 30, 2014.

International Preliminary Report on Patentability for PCT/AU2014/000959, dated Apr. 12, 2016.

Office Action issued in Chinese Patent Application No. 201480065421.0, dated Jul. 4, 2018.

Examination Report received for Australian Application No. 2019202640, dated Jul. 24, 2020.

* cited by examiner

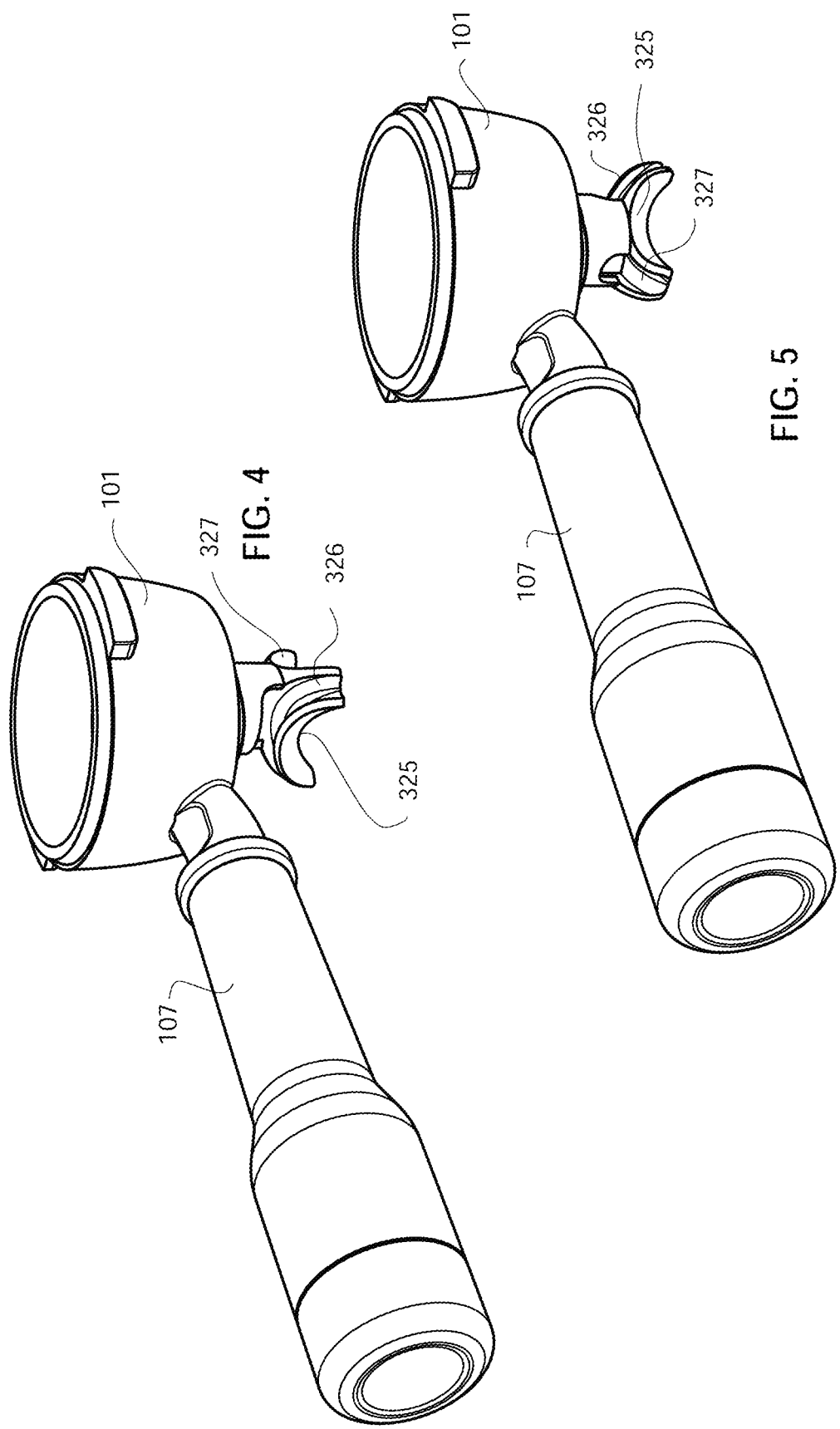

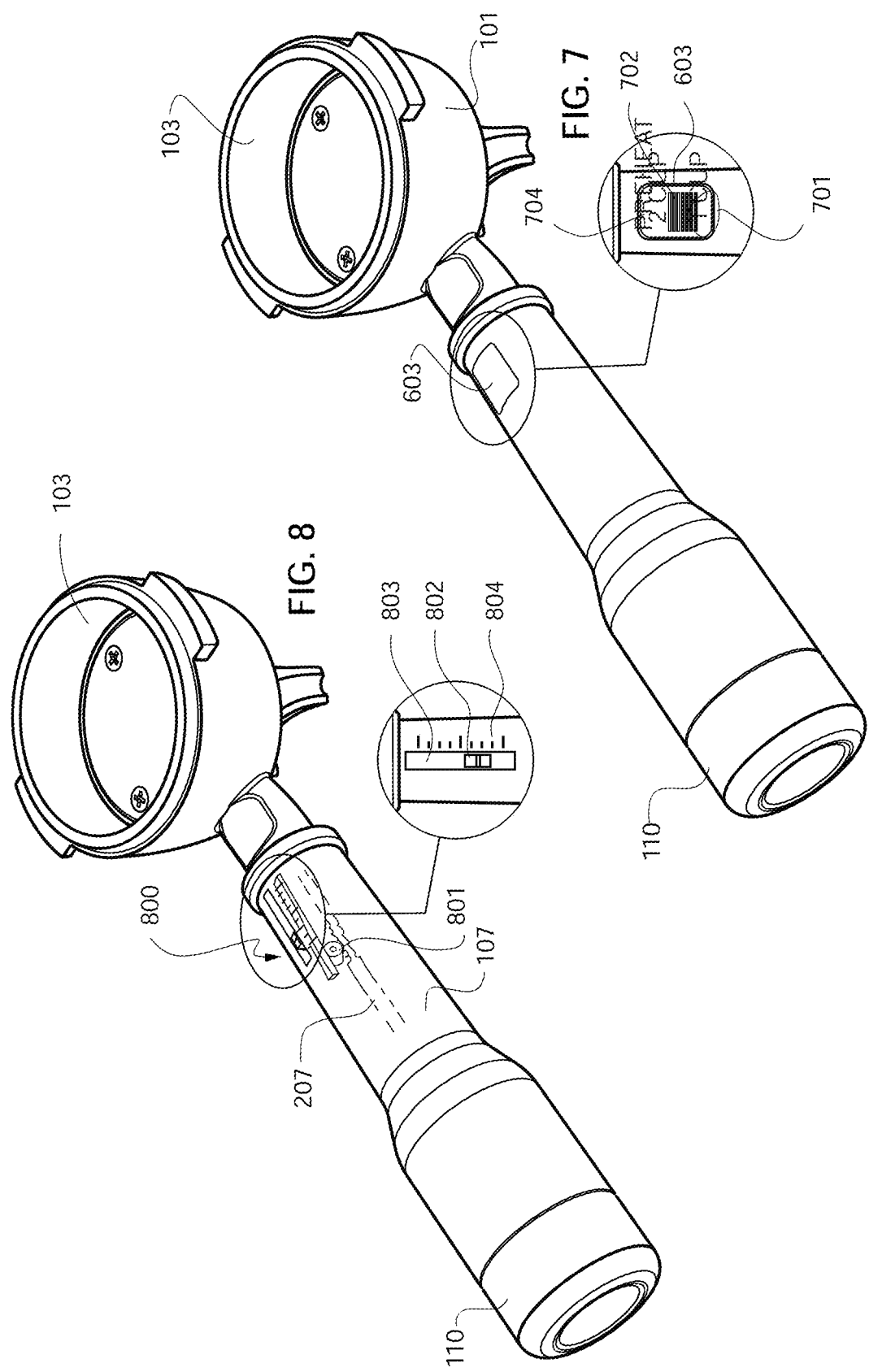

ADJUSTABLE PORTAFILTER AND GRIND ADJUSTMENT

FIELD OF THE INVENTION

The invention relates to portafilters and more particularly to a portafilter with variable volume adjustment.

BACKGROUND OF THE INVENTION

Any discussion of the prior art throughout the specification should in no way be considered as an admission that such prior art is widely known or forms part of the common general knowledge in the field.

A portafilter is a device that attaches onto the group head of an espresso making machine and that carries a quantity or dose of ground coffee in a compartment with a perforated floor that acts as a filter. The compartment is sometimes referred to as a basket and in some portafilters, the basket is interchangeable. Baskets of different capacity and flow characteristics may thereby be interchanged with one another. For example, a double-shot of ground coffee requires a basket with a 12-14 gram capacity. A single-shot basket might hold, for example, 6-7 grams. Some portafilters can receive a basket for a triple-shot, thereby having a ground coffee capacity of 18-21 grams. Even when a portafilter can receive interchangeable baskets, the grind capacity of any single basket is generally fixed because obtaining an optimal brew requires the fill height of the ground coffee in the basket to remain relatively constant.

Optimising the coffee brewing process also requires that the head of the portafilter be pre-heated to reach an optimal working temperature. Gauging whether or not the head of an ordinary portafilter has reached the pre-heat temperature is difficult, particularly if the portafilter has been disengaged from the group head for some time before being re-used.

In a machine where different ground coffee quantities are sought to be brewed, neither the coffee grinder that dispenses the grounds into the portafilter nor the coffee machine that dispenses the hot water through the portafilter are able to compensate for the different ground coffee quantities other than by user command or human input directly into the grinder or machine.

A portafilter can be particularly adapted for either a single-shot and have a single spout or a double-shot and have a double spout.

The present invention addresses the above limitations in the coffee brewing process.

SUMMARY OF THE INVENTION

According to an embodiment there is provided a portafilter having a basket whose volume is adjustable.

According to an embodiment there is provided a portafilter having a basket whose volume is continuously adjustable.

According to an embodiment there is provided a portafilter that can sense and display or communicate its own temperature.

According to an embodiment there is provided a portafilter that can wirelessly communicate parameters such as basket volume and temperature to an espresso making machine or a coffee grinder.

According to an embodiment there is provided a portafilter having both a single spout and a double spout.

According to an embodiment there is provided a portafilter apparatus for an espresso machine, the apparatus comprising:
- a metal head that is attachable to a group head of the espresso machine,
- the head defines a coffee grounds compartment for containing a quantity of ground coffee; and
- a perforated movable floor within the head; the floor forms a filter and defines the base of the coffee grounds compartment, the floor is vertically movable with respect to the head to adjust a volume of the coffee grounds compartment.

The apparatus may further include: a handle coupled to the head; and a volume adjustment selector located about the free end of the handle is operatively associated with the floor, such that rotation of the selector causes the floor to raise or lower with respect to the head.

The perforated floor may be supported by a moving floor body. The body may include a vertical thread rack that is driven by a pinion and bevel gear assembly; the pinion and bevel gear assembly is rotated by a main shaft that passes through the handle. Rotation of the volume adjustment selector may cause rotation of the shaft to raise or lower the floor with respect to the head.

A gearbox located about the free end of the handle may terminates the shaft, such that rotation of the volume adjustment selector actuates the gearbox to cause rotation of the shaft. The gearbox may be in the form of a planetary gearbox.

Hot water from the group head may enters an open mouth of the compartment, passes through the ground coffee and exits the compartment through the perforated floor.

The floor may be associated with a circumferential seal that extends between the floor and an interior side wall of the compartment.

Volume of the coffee grounds compartment may be continuously adjustable between a predefined minimum volume and a predefined maximum volume.

A controller module may receive signals from one or more sensors associates with the portafilter. A temperature sensor may measure the temperature of the head and transmits a signal indicative of the temperature state to the controller module. A position sensor may provide a signal indicative of a volume state of the coffee grounds compartment to the controller module. The position sensor may measure a rotational position of the selector or main shaft A display module may be coupled to the controller module for presenting information of a state indicated by the one or more sensors.

A receiver may receive a data signal from an appliance for configuring settings of the controller module. A receiver may receive electromagnetic energy to charge an internal power source and/or it capacitor for powering the controller module. The receiver may be in the form of a wireless receiver.

A transmitter may transmit a data signal to an associated appliance for configuring setting of the associated appliance. The transmitter may transmit a data signal indicative of a volume of the coffee grounds compartment to the espresso machine for configuring a water delivery volume. The transmitter may transmit a data signal indicative of a volume of the coffee grounds compartment to a coffee grinder machine for configuring a ground coffee delivery volume. The transmitter may be in the form of a wireless transmitter.

BRIEF DESCRIPTION OF THE DRAWING FIGURES

In order that the invention be better understood, reference is now made to the following drawing figures by way of example, in which:

FIG. 4 is a perspective view of the portafilter shown in FIG. 1, with double spout in place.

FIG. 5 is a perspective view of the portafilter shown in FIG. 11, with single spout in place.

FIG. 7 is a perspective view of a portafilter with an electronic display.

FIG. 8 is a perspective view of a portafilter having a mechanical display.

DETAILED DESCRIPTION

Figure 1:
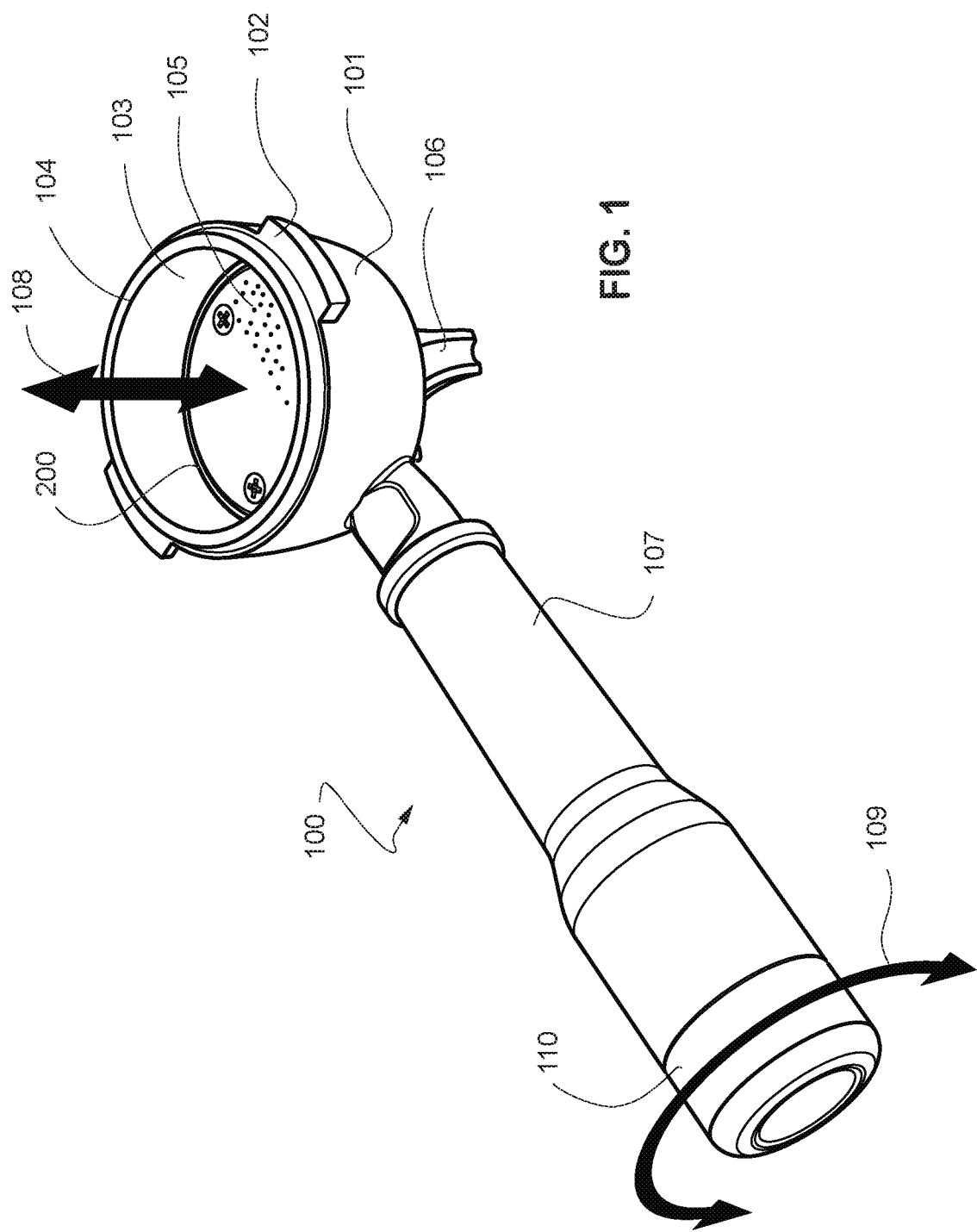
FIG. 1 is a perspective view of a portafilter having a variable volume compartment.

As shown in FIG. 1, a portafilter 100 has a metal head 101 with male bayonet features 102 that attaches to the group head of an espresso making machine. The head 101 has a coffee grounds compartment 103 for containing a quantity or dose of ground coffee. Hot water from the group head enters the open mouth 104 of the compartment 103, passes through the ground coffee and exits the compartment 103 through a perforated floor 105 that forms the filter of the compartment 103. Brewed coffee that passes through the filter 105 is dispensed from a spout 106. The head 101 is retained by a handle 107. In this example, the floor 105 of the compartment is adjustable vertically 108 in accordance with the rotation of a selector 110, for example a rotatable knob, located at the free end of the handle 107.

As shown in FIG. 2A and FIG. 2B, the perforated filter or floor 105 is associated with a circumferential seal 200 that extends between the vertically adjustable floor 105 and the interior side wall 201 of the compartment or basket 103. Thus, hot water entering the basket can exit only through the floor and not around it. In this example, the perforated filter or floor 105 is supported by a moving filter floor body 202. The body 202 supports the floor 105 above a gap 203 that leads to a central discharge passageway 204. The discharge passageway 204 terminates above and discharges onto the spout 106. The body 202, in this example, incorporates a vertical gear rack or thread 205 that is driven by, in this example, a pinion and bevel gear assembly 206. The pinion and bevel gear assembly 206 is rotated by a main shaft 207 that passes through the handle and terminates at a gear box, for example a planetary gear box 208 that is actuated by the portafilter's rotating selector 110, for example as rotatable knob.

Figure 3:
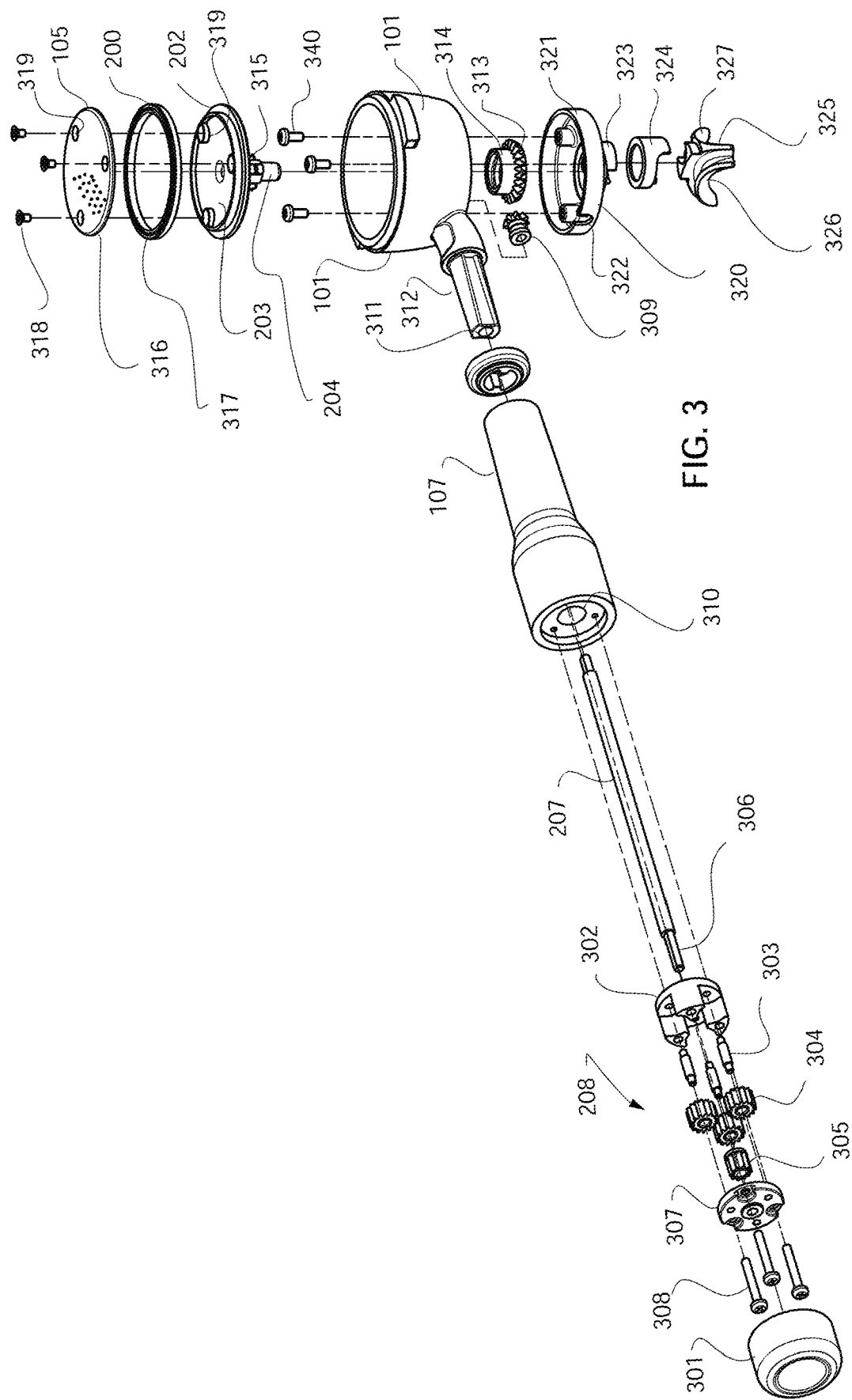
FIG. 3 is an exploded perspective view of the portafilter depicted in FIG. 1.

As shown in more detail in FIG. 3, the gearbox assembly 208 is contained, at least partially, under the peripheral rim 301 of the rotating selector or knob, and between the selector/knob and the remainder of the handle 107. The planetary gearbox assembly in this example comprises a gear housing 302 that supports three planetary gear shafts 303. Each gear shaft supports a planetary gear 304. The planetary gears 304 drive a planetary pinion gear 305 that is attached to a proximal end 306 of the main shaft 207. The proximal ends of the planetary gear shafts 303 are retained by a gear housing cover 307 and the cover 307 is affixed to the gear housing with, in this example three axial, threaded fasteners 308. In preferred embodiments, the planetary gearbox mechanism reduces the rotation of the selector 110 so that, for example, one full revolution of the selector 110 results in four revolutions of the main shaft 207.

Figure 2:
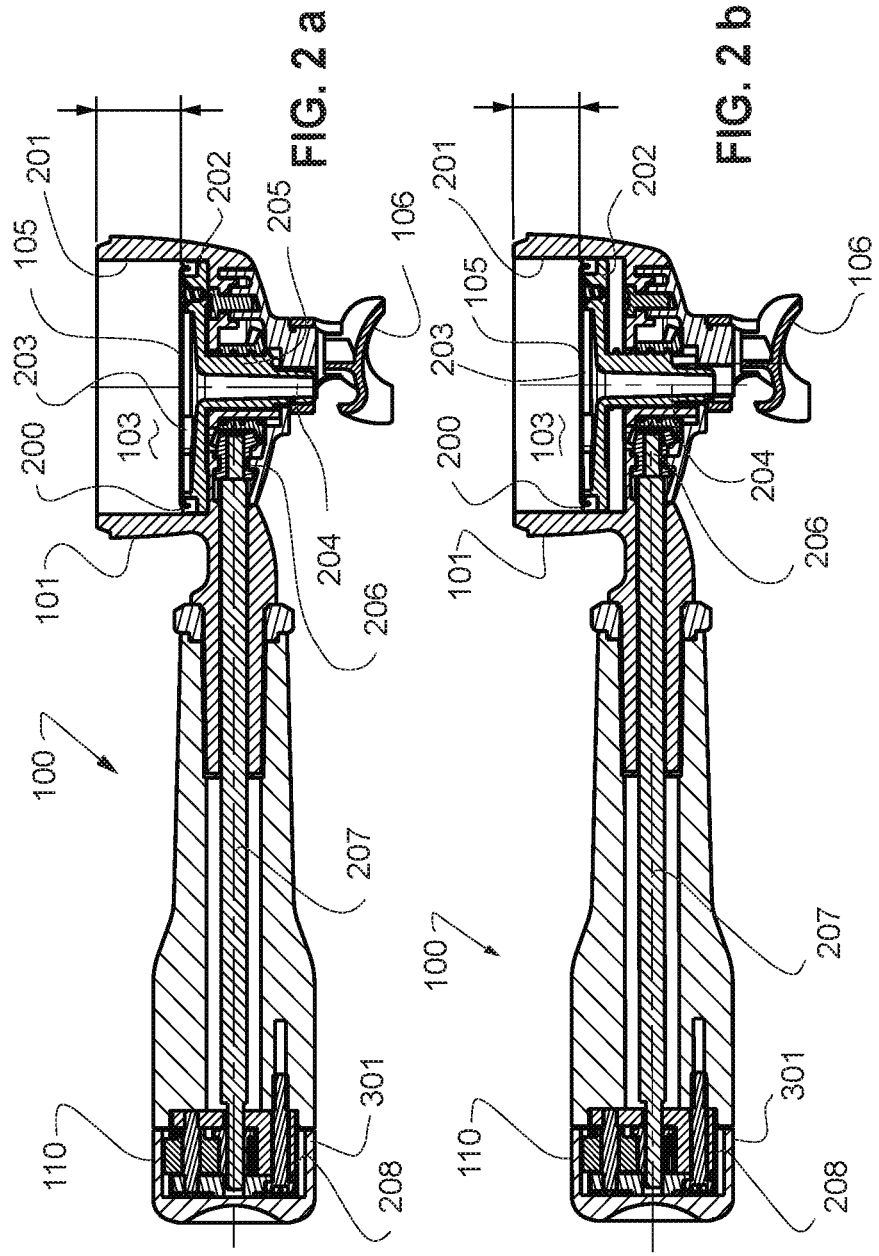
FIG. 2A is a cross sections through the portafilter shown in FIG. 1.
FIG. 2B is a cross sections through the portafilter shown in FIG. 1.

The main shaft 207 is supported at one end by the planetary pinion gear 305 and at the distal end by a drive pinion gear 309. As shown in FIG. 2A through FIG. 3, the drive pinion gear 309 is located beneath the filter floor body 202 and within the portafilter's head 101. Thus, rotation of the selector 301 (for example, a rotatable knob) is transmitted by the main shaft 207, through a central passageway 310 in the handle 107 and a second passageway 311 through the neck 312 of the head 101 to the drive pinion gear 309. Rotation of the drive pinion gear 309 about the horizontal axis of the main shaft 207 causes a rotation of a drive bevel gear 313 about a vertical axis. The drive bevel gear 313 has a collar 314 that is internally threaded and that engages cooperating teeth or threads 315 located on the filter floor body 202.

In the example of FIG. 3, the filter floor 105 comprises a circular perforated disk having a descending rim 316 that cooperates with a groove 317 in the peripheral seal 200. Flush fasteners 318 pass through cooperating openings 319 in the filter floor and thus serve to removeably clamp or retain the seal 200 between the floor 105 and the filter floor body 202. The filter floor body 202 has threaded openings 319 for receiving the flush fasteners 318. The perforated floor 105 and seal 200 can be removed for cleaning by withdrawing the threaded fasteners 318. The filter flood body 202 may also be removed for cleaning, by rotating it to unseat the threads 315 from the internal threads of the collar 314. This also provides access to the fasteners 340 that affix the cover 320 to the head 101.

The underside of the head 101 accommodates a cover 320. In this example, the cover 320 has a peripheral rim 321 having a notch 322 that allows the main shaft 207 to pass through it. The cover 320 has an outlet rim 323 that is provided with an outlet cover 324 that receives a revolving 3-way spout 325. Because the discharge opening of the outlet 323 is eccentric, (see FIG. 2A through FIG. 3) brewed coffee being discharged from the passageway 204 will fall onto an inverted "U" shaped dual spout 326 (see FIG. 4) or a single spout 327 (see FIG. 5) depending on the rotational orientation of the spout outlet 325.

Figure 6:
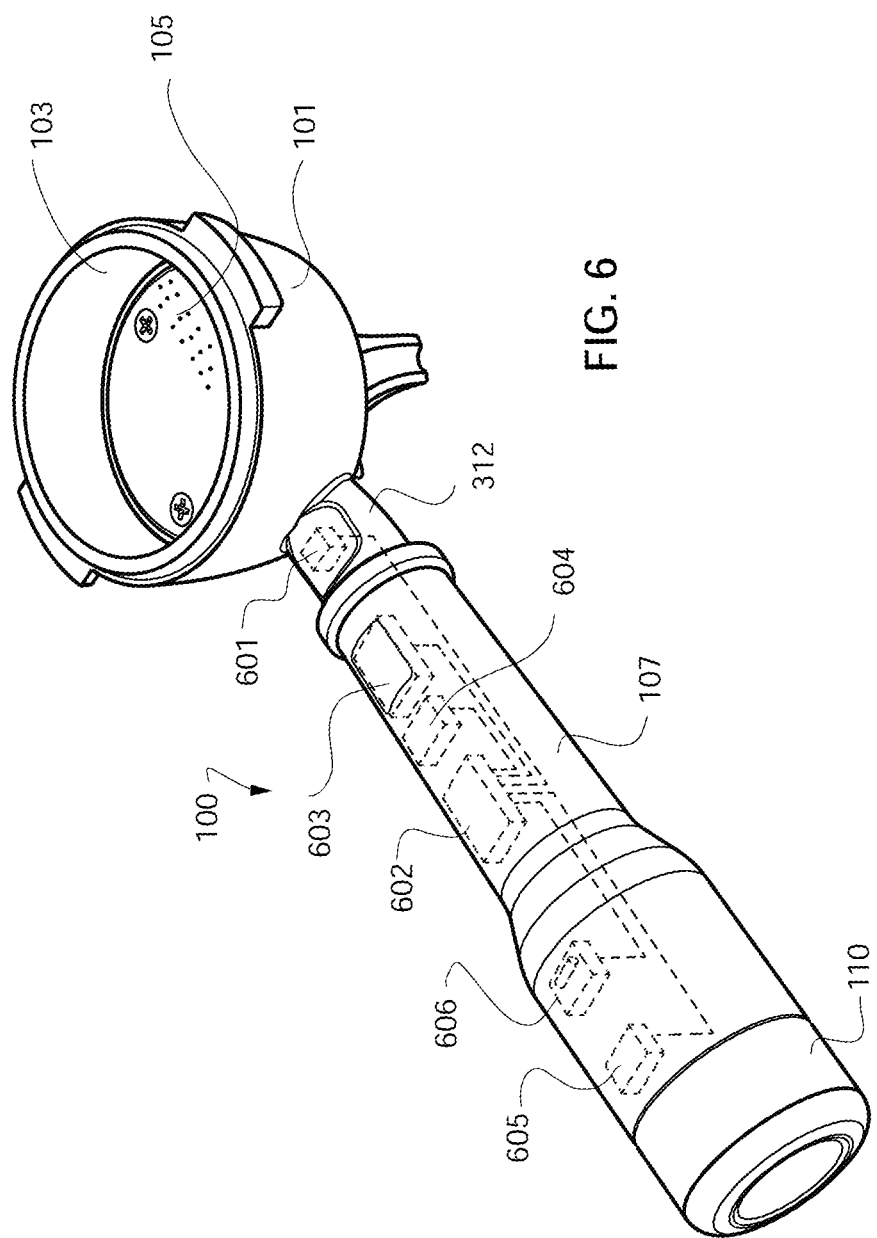
FIG. 6 is a perspective view of a portafilter having an internal processor, a graphic display and other features.

As shown in FIG. 6, a portafilter too, may have a head 101 or neck 312 in which is internally incorporated a temperature sensor such, as a thermistor 601. In this example, the thermistor measures the temperature of the metallic head 101 and transmits the relevant signal information to a controller or processor 602 located within the handle 107. The controller 602 is adapted to drive an electronic graphic display 603 located, in this example, on an upper surface of the handle 107 adjacent the neck 312. In preferred embodiments, the handle also has within it, a position sensor 604 that cooperates with, for example, the selector 110 or the rotating main shaft 207. The rotational position of the shaft, because it drives the vertically reciprocating floor 105 is indicative of the internal volume or working capacity of the basket or compartment 103. The position sensor 604 transmits data to the processor 602 which in turn is adapted to provide a graphic indication, either numerically or symbolically on the display 603. Power required for the processor, instrumentation and display is provided by an internal battery or capacitor 605 located within the handle 107. In particularly preferred embodiments, data relating to the output of the temperature sensor 601 and the position sensor 604 can be transmitted wirelessly by a combination transmitter and optimal receiver 606 also located within the handle 107. Data signals received by the receiver 606 can be processed by the controller 602 and displayed on the display area 603. The receiver 606 may also be used to receive electromagnetic energy and use that energy to charge the internal battery or capacitor 605.

As shown in FIG. 7, the electronic display 603 is adapted to indicate, either alphanumerically 701 or symbolically 702 (or both), the volume or working capacity of the compartment 103, in real time as the selector 110 is rotated. The electronic display 603 can also provide an alphanumeric or graphic symbol 704 that indicates when the correct pre-heat temperature has been achieved in the head 101 as recorded by the temperature sensor 601.

As an alternative to an electronic display, an as suggested by FIG. 8, a mechanical display 800 may be provided on an upper surface of the handle 107. In this example, rotation of the main shaft 207 is converted by a gear mechanism 801 into the linear movement of a sliding pointer 802 that is carried within a slot 803 formed on an upper surface of the handle 107. Index marks 804 next to the slot 803 provide an indication of the internal volume of the compartment 103.

As a further alternative to an electronic display, a plurality of incremental indicators may be printed, or formed on the surface of the handle and/or selector (e.g. rotatable knob) that correspond to the user selection or perimeter or measured state.

It will be appreciated that the aforementioned adjustment mechanism that controls the height of the filter floor and thus the volume of the compartment 103 is continuous or stepless. Tactile feedback and/or graphical feedback and/or audio feedback can be provided to the user for indicating advancement of the selector and resultant movement of the compartment floor.

Figure 9:
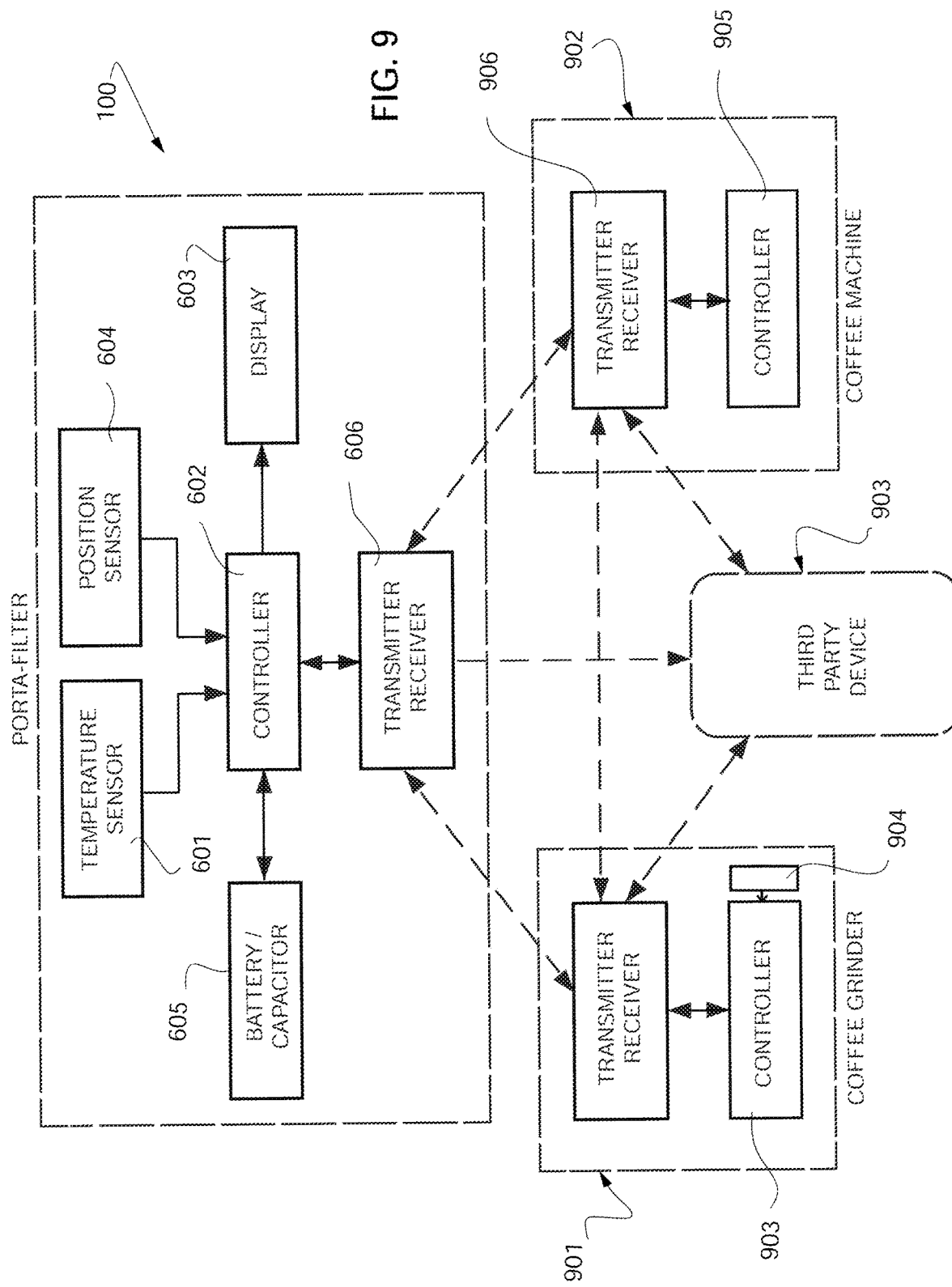
FIG. 9 is a schematic diagram of a network comprising a coffee grinder, portafilter, coffee machine and communications device.
Figure 10:
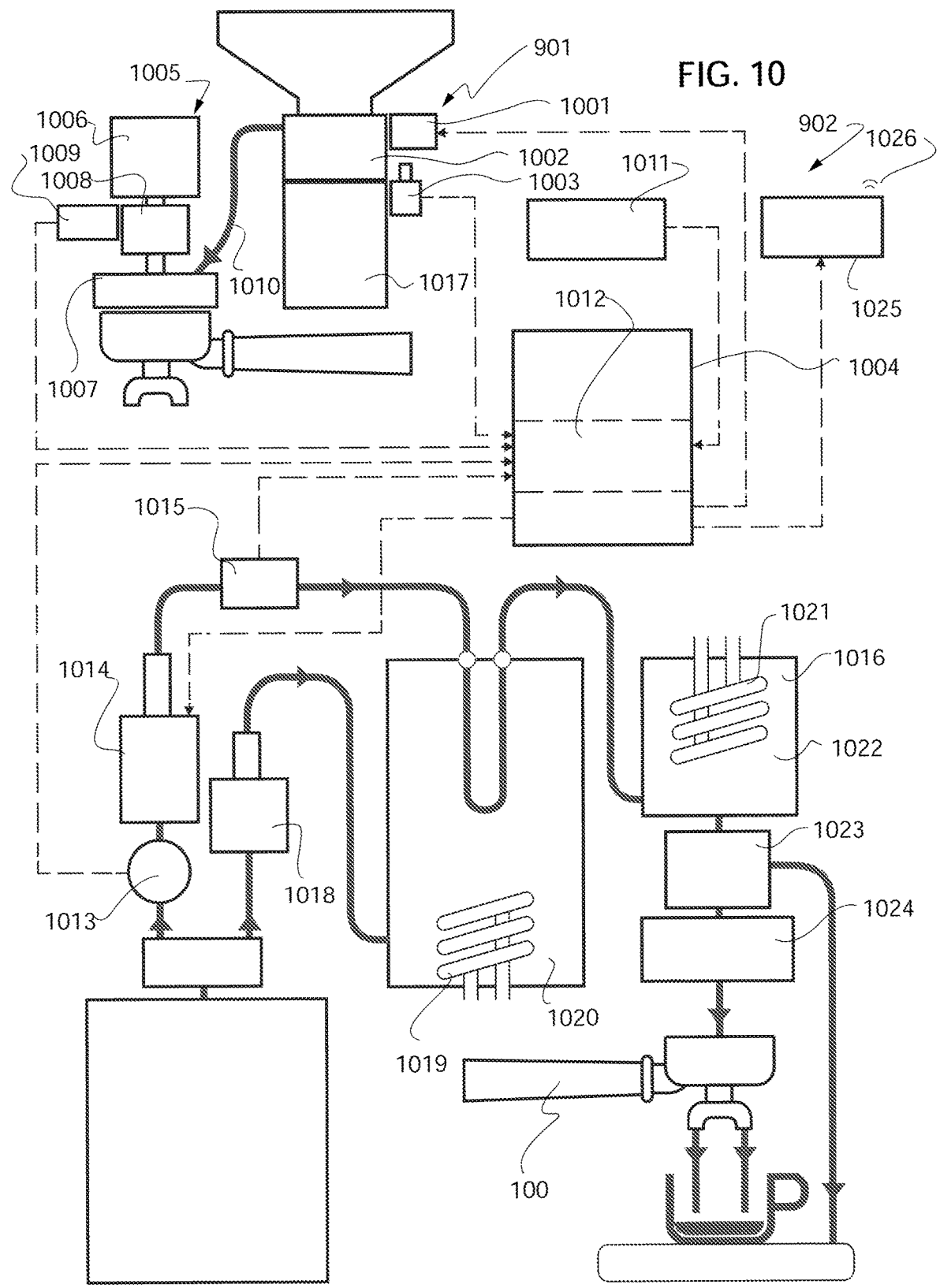
FIG. 10 is a schematic diagram of an espresso coffee machine having a processor controlled grind adjustment and other features.

As shown in FIG. 9 and FIG. 10, a portafilter 100 constructed in accordance with the above teachings can form part of a wireless network in conjunction with a coffee grinder 901 (being a grinder that is either internal or external to an espresso making machine), an espresso making machine 902 and a personal preferably wireless communications device 903 such as a smart phone, personal computer, tablet, pad or the like. The wireless communication between the aforementioned devices 100, 901, 902, 903 allow for a wide range of benefits and functionality including individually, and in any practical combination, the following examples.

With reference to the example of FIG. 9, wherein the coffee grinder 901 and coffee machine 902 are separate (or FIG. 10 when the grinder is integrated with the coffee machine and optionally shares its controller), communication between the coffee grinder 901 and coffee machine 902 can enable wireless or hard wired communication of data signals and command signals between the coffee grinder 901 and the coffee machine 902. User inputs or commands relating to the grind size and duration may be provided to the coffee grinder's controller either from the coffee grinder's user interface 904 or from the personal communication device 903. These user inputs are used to operate a grind adjust position motor tool that raises and lowers a burr in the grinder's grind head 1002 and thus alter the size of the grinds produced by the grinder 901. In some embodiments, the actual position of the burrs is detected by a grind adjust position sensor 1003. Data from the grind adjust position sensor is provided to either the coffee grinder's controller 903 (FIG. 9) or a central controller 1004 (FIG. 10). In this way, data relating to the user's grind selection, the actual position of the adjustable burrs and the grind duration can be broadcast by the grinder 901 and, for example, logged by the communication device 903 or used by the coffee machine's controller 905 (wirelessly via the coffee machine's transmitter and receiver 906 and controller 905, or hard wired per FIG. 10). This information is used by the coffee machine's controller 905, 1004 to control aspects of the brewing process such as water temperature, brew duration, brew water press re profile etc. These same parameters can also be controlled by corresponding user inputs originating in the communications device 903. Thus, the communication device 903 can transmit commands to alter the functionality or operation parameters of the coffee machine 902, the grinder 901 or both of these 901, 902.

It will be appreciated that data from the portafilter 100 regarding head temperature and compartment volume may be provided wirelessly to the coffee grinder 901 so that it can be used by the grinder's controller 903 to adjust the delivery volume of ground coffee. Data from the portafilter 100 can also be wirelessly transmitted to the coffee machine 902 so that the device's controller 905, 1004 can adjust the volume of water delivered to the portafilter. The data transmitted b the portafilter 100 can also be transmitted to the communications device 903 where it can be logged or recorded for future use.

The network arrangement described above can be used in the following ways. For example, a skilled operator could program brew parameters such as brew temperature, extraction time, grind volume, tamping pressure via a software program installed on the communications device 903. These parameters can then be uploaded or transmitted to the coffee machine 902 and grinder 901 whereby control programmes associates with the appropriate controllers 903, 905, 1004 will execute the selected parameters for the purpose of replicating the operator's selected beverage. In another example, the grinder 901 or coffee machine 902 can transmit or download data to the communications device 903 for the purpose of the diagnosis of a problem or potential problem by the user or a service technician. The communications device 903 can accordingly provide a graphic display that relates to the diagnostic data or provide advice in the form of text or images that relates to solutions to the diagnostic or the problem suggestion by the diagnostic data. In another example, data from all of or any of the portafilter 100, coffee grinder 901 or coffee machine 902 can be transmitted to and collected by the communications device 903 and logged or recorded for future use. This would allow a user to replicate a particular brew temperature, extraction volume, extraction pressure profile and other parameters once off, repeatedly, or as a data package that can be shared among different users.

In other examples, and as suggested by FIG. 10, a coffee machine 902 with (in this example) an integral or built-in coffee grinder 901 includes a tamping system such as a motorised tamping auger 1005. The tamping system 1005 further comprises a DC auger motor 1006 that is controlled by the device's processor 1004. The motor 1006 drives a rotating auger head 1007 through an adjustable slip clutch 1008 that is associated with a torque sensor 1009. Ground coffee delivered by the burr grinder 1002 enters the auger head 1007 through a delivery chute 1010. The coffee machine 902 further comprises a user interface ion that communicates with the processor and through which user inputs, commands or preferences can be expressed to the processor inputs 1012. Other inputs to the processor include signals relating to the output of the torque sensor 1009, the flow rate indicated by the flow meter 1013 that is in-line with the high pressure water deliver pump 1014, an in-line pressure sensor 1015 that is in-line between the high pressure pump 1014 and the brew water boiler 1016 and the output of the grind adjust position sensor 1003. Utilising these inputs, the controller 1004 is able to exercise control over the grind adjust position motor 1001, the grinder motor 1017, the auger motor 1006, both the high pressure brew water delivery pump 1014 and the lower pressure steam water delivery pump 1018, the heating element 1019 of the steam boiler 1020, the heating element 1021 of the brew water boiler 1022, the discharge solenoid 1023 that controls the output to the group head 1024 and the graphic display 1025. In this way, the is processor 1004 can use feedback from the flow meter 1013, the pressure sensor 1014, the grind adjust position sensor 1003, the tamp torque sensor 1009 and the extraction tune to calculate an ideal grind size setting and to regulate the grind, adjust motor 1001 accordingly. The processor 1004 uses feedback from the flow meter 1013, the pressure sensor 1015, the grind adjust position sensor 1003, the tamp torque sensor 1009 and the extraction time to calculate au ideal torque tamp setting and thereby regulate the action of the auger motor 1006 to deliver the calculated torque tamp setting. For example, if a previous extraction was too fast, the processor can reduce the grind size by adjusting the grind adjust motor 1001 and thereby the grind size to make the grind smaller and thereby slow the extraction process. If a previous extraction was too slow, then the grind size can be made larger by controlling the grind size adjust motor 1001 in conjunction with a monitoring of same from the grind adjust position sensor 1003. Similarly, the previous extraction was too fast, the tamp pressure can be increased by changing the target or threshold resistance as determined by the torque sensor 1009. Similarly, the previous extraction was too slow, then the tamp pressure can be decreased and the grinder motor will stop at a lower torque resistance as determined by the torque sensor 1009.

In another embodiment where no grind size adjust motor 1001 is utilised, the processor can prompt the user using the display 1025 or with the is emission of an audio tone 1026 to adjust the grind size manually, for example, from the user interface 1011.

Thus, the processor 1004 is able to receive signals from various sensors and calculate target parameters for various machine functions including grind size and tamp pressure and then execute those parameters, for example by is automatically adjusting grind size or tamp pressure using processor controlled motors 1001, 1006 and appropriate feedback devices 1003, 1009.

Although the invention has been described with reference to specific examples, it will be appreciated by those skilled in the art that the invention may be embodied in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller computer or computing system, or similar electronic computing device, that manipulates and/or transforms data.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

While the present invention has been disclosed with reference to particular details of construction, these should be understood as having been provided by way of example and not as limitations to the scope or spirit of the invention.

The invention claimed is:

1. A portafilter apparatus for an espresso machine, the apparatus comprising:
    a metal head that is attachable to a group head of the espresso machine, wherein the metal head defines a coffee grounds compartment for containing a quantity of ground coffee;
    a perforated movable floor within the metal head, wherein the floor forms a filter and defines the base of the coffee grounds compartment, wherein the floor is vertically movable with respect to the metal head, wherein the perforated floor is supported by a moving floor body;

a pinion and bevel gear assembly located within the metal head and beneath the moving floor body;
a handle coupled to the metal head;
a main shaft that passes through the handle and rotates the pinion and bevel gear assembly;
a planetary gearbox located about the free end of the handle, wherein the planetary gearbox terminates the shaft; and
a volume adjustment selector located about the free end of the handle and operatively associated with the perforated floor,
wherein the moving floor body includes a vertical thread rack that is driven by the pinion and bevel gear assembly to adjust a volume of the coffee grounds compartment, and
wherein the planetary gearbox connected to the volume adjustment selector such that a rotation of the volume adjustment selector around the handle by a user actuates the planetary gearbox, actuation of the planetary gearbox causes rotation of the main shaft, and rotation of the main shaft causes the perforated floor to raise or lower with respect to the metal head.

2. The portafilter apparatus according to claim 1, wherein: hot water from the group head enters an open mouth of the compartment, passes through the ground coffee and exits the compartment through the perforated floor.

3. The portafilter apparatus according to claim 1, wherein: the floor is associated with a circumferential seal that extends between the floor and an interior side wall of the compartment.

4. The portafilter apparatus according to claim 1, wherein: volume of the coffee grounds compartment is continuously adjustable between a predefined minimum volume and a predefined maximum volume.

5. The portafilter apparatus according to claim 1, the apparatus further including:
a controller module that receives signals from one or more sensors associates with the portafilter.

6. The portafilter apparatus according to claim 5, the apparatus further including:
a temperature sensor that measures the temperature of the metal head and transmits a signal indicative of the temperature state to the controller module.

7. The portafilter apparatus according to claim 5, the apparatus further including:
a position sensor that provides a signal indicative of a volume state of the coffee grounds compartment to the controller module.

8. The portafilter apparatus according to claim 7, wherein: the position sensor measures a rotational position of the selector or the main shaft.

9. The portafilter apparatus according to claim 5, the apparatus further including:
a display module coupled to the controller module for presenting information of a state indicated by the one or more sensors.

10. The portafilter apparatus according to claim 5, the apparatus further including:
a receiver that receives a data signal from an appliance for configuring settings of the controller module.

11. The portafilter apparatus according to claim 10, the apparatus further including:
a capacitor for powering the controller module.

12. The portafilter apparatus according to claim 10, wherein the receiver is a wireless receiver.

13. The portafilter apparatus according to claim 5, the apparatus further including:
a transmitter that transmits a data signal to an associated appliance for configuring settings of the associated appliance.

14. The portafilter apparatus according to claim 13, wherein:
the settings comprise a water delivery volume.

15. The portafilter apparatus according to claim 13, wherein:
the settings comprise a ground coffee delivery volume.

16. The portafilter apparatus according to claim 13, wherein the transmitter is a wireless transmitter.

17. The portafilter apparatus according to claim 10, wherein the receiver receives electromagnetic energy to charge an internal power source.

18. A portafilter apparatus for an espresso machine, the apparatus comprising:
a metal head that is attachable to a group head of the espresso machine, wherein the metal head defines a coffee grounds compartment for containing a quantity of ground coffee;
a perforated movable floor within the metal head, wherein the floor forms a filter and defines the base of the coffee grounds compartment, wherein the floor is vertically movable with respect to the metal head, wherein the perforated floor is supported by a moving floor body;
a pinion and bevel gear assembly located within the metal head and beneath the moving floor body;
a handle coupled to the metal head;
a main shaft that passes through the handle and rotates the pinion and bevel gear assembly;
a planetary gear assembly driving the pinion and bevel gear assembly, wherein the planetary gear assembly comprises a planetary gearbox located about the free end of the handle, wherein the planetary gearbox terminates the shaft; and
a volume adjustment selector located about the free end of the handle and operatively associated with a planetary gear assembly driving the pinion and bevel gear assembly,
wherein the moving floor body includes a vertical thread rack that is driven by the pinion and bevel gear assembly to continuously adjust a volume of the coffee grounds compartment, and
wherein the planetary gearbox connected to the volume adjustment selector such that a rotation of the volume adjustment selector around the handle by a user actuates the planetary gearbox, actuation of the planetary gearbox causes rotation of the main shaft, and rotation of the main shaft causes the perforated floor to raise or lower with respect to the metal head.

19. The portafilter apparatus of claim 1, wherein the pinion and bevel gear assembly comprises a drive pinion gear, and wherein the main shaft is supported at a first end by the planetary gearbox and at a second end by the drive pinion gear.

20. The portafilter apparatus of claim 19, wherein the pinion and bevel gear assembly further comprises a drive bevel gear, wherein rotation of the main shaft causes rotation of the drive pinion gear about a horizontal axis of the main shaft, and wherein rotation of the drive pinion gear causes rotation of the drive bevel gear about a vertical axis.

* * * * *